Aug. 29, 1972    H. BIEBER ET AL    3,687,746
ROCKET PROPELLANT SYSTEM
Filed June 16, 1969
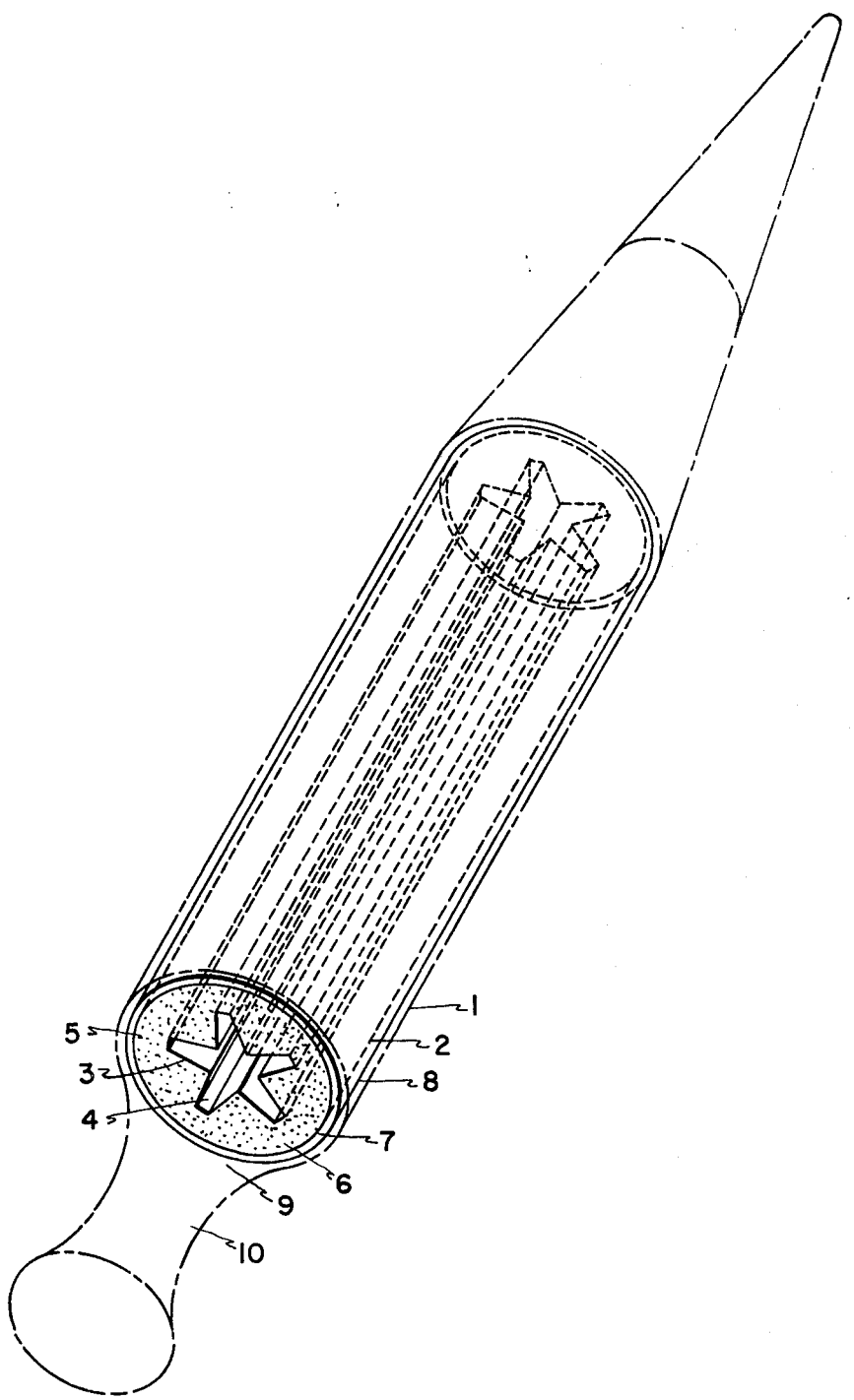
Herman Bieber
Lawrence Spenadel   INVENTORS
David M. Coddington
BY R.D. Manahan
PATENT ATTORNEY

3,687,746
ROCKET PROPELLANT SYSTEM
Herman Bieber, Kenilworth, Lawrence Spenadel, Elizabeth, and David M. Coddington, Irvington, N.J., assignors to Esso Research and Engineering Company
Filed June 16, 1959, Ser. No. 820,826
Int. Cl. C06d 5/10
U.S. Cl. 149—19                              10 Claims The present invention relates to novel cellular substances which are useful as supports for fuels and/or oxidizing agents employed in rocket propellants. Specifically, it concerns a propellant system comprising a cellular polymeric substance composed of a mixture of an elastomer and a resin that contains a fuel and an oxidizer which react to impart propulsion to rocket devices.

A rocket propulsion device as used herein is a rigid container for matter and energy so arranged that a portion of the matter can absorb the energy in kinetic form and subsequently eject it in a specified direction. The type of rocket to which the invention has particular application is that which is generally designated as a pure rocket, that is to say, a rocket in which the means producing the thrust does not make use of the surrounding atmosphere. The rocket is propelled by contacting the fuel or propellant in a combustion chamber with a suitable oxidizing agent which produces burning and therefore causes the release of energy at a high but controllable rate from the combustion chamber. The solid bi-propellants normally used in rockets consist of solid fuel and solid oxidizing agents. While solid oxidizing agents are highly useful, they are usually less effective than liquid oxidizing agents because the latter, in most instances, permit attainment of higher specific impulses.

It is an object of this invention to provide a novel sponge support for liquid and solid propellant components. Another object is to prepare a hybrid propellant containing a liquid oxidizing agent which has the dimensional integrity possessed by solid propellants.

In accordance with the present invention, novel sponges or foams are prepared by admixing a major proportion of an elastomer with a minor proportion of resin, and thereafter precipitating or curing and blowing the mixture to produce a cellular substance which has fine physical properties, especially tensile strength. It has been discovered that the addition of polyethylene and/or polypropylene to a rubber sponge or foam mix surprisingly increases the strength of the sponges. These resins, when added in optimum amounts, cause about a fivefold improvement in tensile strength.

A strong elastic propellant is desirable in pure rockets which employ solid chemical motors to propel them. The solid propellants in such rockets experience severe stresses, e.g. pressures of 300 to 1500 p.s.i., while burning in the combustion chamber which can cause cracks and fissures in the propellant that in turn result in uneven burning and sometimes detonation. In order to insure even burning, the solid propellant should have sufficient elasticity to contract and expand under the pressures built up in the combustion chamber yet be strong enough to withstand and resist the actions of the gaseous forces in the chamber. The present invention overcomes this problem by providing a strong elastic structure which allows the use of liquid oxidizing agents. Because the invention is especially applicable to sponges, the description which follows is mainly directed to the preparation of sponge bi-propellants.

In preparing the sponges of the present invention, a major proportion of rubbery polymer, such as butyl rubber, is admixed with a minor proportion of a solid $C_2$ to $C_3$ resin, compounded in the conventional manner with curing agents, blowing agents, etc. and blown at elevated temperatures to produce a sponge having good elastic and outstanding tensile strength properties. Improved tensile strength properties are obtained when the total polymer in the sponge contains at least 10 weight percent resin, the remainder of the polymer being the particular rubber whose tensile strength is improved. It has been noted that the sponges having the best overall properties are those which contain about 25 to 35 weight percent resin and 65 to 75 weight percent elastomer.

The accompanying drawing is a chematic sectional view of a rocket containing a hybrid bi-propellant of the present invention which is shown in perspective view in place in the rocket.

Polyethylene may be obtained from either the so-called low pressure or the high pressure process, while polypropylene is commercially prepared only by the low pressure process, e.g. 5 to 100 atmospheres pressure, in which a titanium chloride-triethyl aluminum catalyst system in generally employed. Regardless of the source, the resin, which is preferably linear, should have a molecular weight of at least 10,000 as determined by intrinsic viscosity (I. Harris correlation—J. Polymer Science 8, 361, 1952). The upper molecular weight limit is not fixed but usually is about 300,000 and in some instances as high as 3,000,000, depending upon the polymer. The melting points of these resins are generally in the range of 100–175° C. The following table gives the melting points of the preferred resins.

| Resin: | M.P., ° C. |
|---|---|
| Branched polyethylene | 110–115 |
| Linear polyethylene | 125–135 |
| Linear polypropylene | 160–170 |

The elastomer may be any rubbery polymer, including butyl rubber, natural rubber, styrene-butadiene rubber and other well known rubbers, especially those having carbon backbones. The preferred rubbery polymers are high molecular weight hydrocarbon polymers, i.e. 100,000 to 1,500,000 or 3,000,000 viscosity average molecular weights, having sufficient unsaturation to be cured with conventional vulcanizing agents, such as sulfur.

Butyl rubber, a term well known in the rubber art, e.g. Chapter 24 in "Synthetic Rubber" edited by G. Whitby, is a rubbery copolymer comprising a major proportion of a monoolefin having 4 to 7 carbon atoms and a minor proportion of a multiolefin having 4 to 8 carbon atoms. The most commonly employed monoolefin is isbutylene, although other monoolefins such as 3-methyl-butene-1 and 4-methyl-pentene-1 may be used. Suitable multiolefins, which are generally conjugated diolefins, include isoprene, butadiene-1,3, dimethyl butadiene-1,3-piperylene and the like. Most of the copolymers contain about 90 to 99.5 wt. percent isoolefin and 0.5 to 10 wt. percent diolefin, which in most instances is isoprene. The polymerization is generally carried out at a low temperature, e.g. between −50 and −165° C., in the presence of a Friedel-Crafts catalyst, such as aluminum chloride, dissolved in a lower alkyl halide, such as methyl chloride, ethyl chloride, etc. Their preparation is fully described in U.S. Pat. 2,356,128. Butyl rubbers have Wijs iodine numbers between about 1 and 50.

Styrene-butadiene rubber, which generally contains abou 20 wt. percent styrene and 80 wt. percent butadiene-1,3, is made by an emulsion polymerization technique and has a Wijs iodine number above about 300, e.g. 425. Natural rubber has a similar unsaturation. Other rubbers which can be employed in the preparation of these novel sponges are polyisobutylene, polybutadiene, copolymers of hexafluoropropylene and vinylidene fluoride, or any other non-polar rubber.

The sponges for use in the hybrid bi-propellants may be prepared by compounding the desired elastomer-resin mixture with fuel (which may be either a liquid or a solid), a blowing agent, a curing agent and sometimes an accelerator, heating the compounded mixture to a sufficiently high temperature to initiate blowing and curing, and maintaining the mixture at that temperature until the sponge is formed. The following is a typical recipe for a sponge coming within the purview of the invention:

RECIPE

|  | Parts by weight | |
|---|---|---|
|  | General | Preferred |
| Components: |  |  |
| Elastomer plus resin | 100 | 100 |
| Solid fuel | 0–400 | 20–200 |
| Liquid fuel | 0–400 | 100–300 |
| Blowing agent | 5–30 | 10–20 |
| Activator | 2–20 | 4–12 |
| Accelerator | 0.5–20 | 1–5 |
| Curing agent | 0.5–20 | 1–12 |
| Metal oxide | 0.5–20 | 1–10 |

The solid or liquid fuel may be blended with the polymer either on a mill or in a Banbury mixer, depending upon the processability of the elastomer-resin mixture. The metal oxide, curing agent and accelerator are usually added to the elastomer-resin mixture with the fuel, and the blowing agent and its activator, if one is necessary, are advantageously added last at a low temperature, i.e. that is to say below the blowing temperature of the blowing agent.

While liquid fuels, such as naphthenic or paraffinic hydrocarbons may be used, solid fuels are preferred because they generally produce more energy upon combustion. Among the solid fuels which may be admixed with the polymers are metals selected from Groups I–IV of the Periodic Chart of Elements (Lange's Handbook of Chemistry, 8th edition, pages 56–57). In most instances the hydrides of these metals are equally effective fuels. The most outstanding fuels are metal-containing compounds in which the metal is selected from Groups II and III. Suitable fuels include lithium hydride, aluminum hydride, decaborane, magnesium hydride, titanium hydride, titanium, beryllium, magnesium, lithium and especially aluminum and boron.

Accelerating agents, such as tellurium diethyldithiocarbamate and tetramethylthiuramdisulfide, may be employed to assist the curing agent which is usually sulfur or a sulfur-bearing compound. Aside from sulfur, curing agents such as para-dinitrosobenzene, para-quinone dioxime and polymethylol para-substituted phenolic resins may be employed. It is also sometimes desirable to employ a metal oxide, such as zinc oxide or magnesium oxide, in order to obtain outstanding physical properties in the cured sponge.

The blowing agent is generally either a material which will decompose at elevated temperatures to produce an oxygen or a nitrogen-containing gas or it is a volatile organic substance, such as pentane. The gas produced when the blowing agent is heated causes the formation of numerous cells in the polymer mix. Suitable blowing agents include sodium bicarbonate, dinitrosopentamethylene tetramine, azoisobutyric nitrile, P,P'oxybis-benzenesulfonyl hydrazide and pentane. It is sometimes desirable to use an activator, such as urea or stearic acid, to initiate certain blowing agents, for example sodium bicarbonate.

If a closed cell sponge is desired, it should be precured to form a skin on the sponge and thereafter subjected to temperatures which will cause the blowing agent to form cells within the sponge. The blown sponge is maintained at this higher temperature until it is cured. In the case of an open cell sponge, no skin or outer coating is formed prior to the blowing step and therefore the cells in the sponge communicate with the atmosphere. Regardless of whether the sponge is one which contains open or closed cells, it is generally cured at between 300° F. and 320° F. for from 5 to 45 minutes. The sponges prepared in accordance with the invention usually have densities of 0.27 to about 2 grams/cc., tensile strengths of about 50–160 p.s.i. and elongations of 100 to 400%.

One advantage of the present invention is that the fuel may be maintained separate from the oxidizer until just prior to use. For instance, the elastomer-resin mixture compounded with fuel and converted into a sponge forms a matrix for cells which are capable of holding substantial amounts of liquid oxidizing agents. The oxidizing agents may (or may not) be introduced into the cells in the matrix until just before the rocket is to be launched.

The open cell sponges are readily filled with a liquid oxidizing agent by submerging them in the liquid and permitting them to absorb it. In the case of the closed cell sponges, the liquid oxidizing agent must be capable of diffusing through the wall of the sponge into the cells in its interior. Liquids whose solubility parameter $\delta$ (Hildebrand and Scott "Solubility of Nonelectrolytes") lies in the range of 6.5–9.5 are usually suitable for filling closed cell sponges. For example, liquid oxidizers such as tetranitromethane can be used to fill closed cell sponges. However, care must be taken to prevent loss of the oxidizer during storage. It is therefore advisable to store the filled sponge under superatmospheric pressure in a closed chamber, such as a plugged rocket combustion chamber.

The sponges can be partially or completely filled with any liquid oxidizing agent capable of reacting rapidly with the fuel in the matrix upon ignition. The liquid oxidizing agent should not attack the sponge at ambient temperatures and should produce low molecular weight gases upon reaction with the fuel. Many of the oxidizing agents useful in conventional bi-propellant systems may be employed. Among the oxidizing agents which may be used in the hybrid propellants of the present invention are hydrogen peroxide, white fuming nitric acid, red fuming nitric acid, tetranitromethane, nitromethane, hydrazine, hydroxylamine, and bromotrifluoride. The preferred oxidizing agents are inorganic and organic compounds containing either fluorine or oxygen or both. The organic oxidizers generally have a low carbon number, e.g. 1–4 carbon atoms. In order for the sponge to be considered a high energy propellant, it should contain about 75–95 wt. percent fuel and oxidizing agent. The matrix or intercellular substance (exclusive of the fuel) should not comprise more than about 25 wt. percent and preferably less than 10 wt. percent of the propellant.

Turning now to the drawing, there is shown a bipropellant in rocket 1 comprising a cylindrical open cell sponge 2 which has an internal burning surface 3 in the shape of a star. The star-shaped conduit 4 in the center of sponge 2 is parallel with the longitudinal axis of said sponge, and is formed by the burning surface 3. Conduit 4 may be filled with an igniting substance, e.g. black powder, not shown, which may be ignited by some suitable means such as an electric match, also not shown. Of course, the propellant need not be cylindrical nor have an internal burning surface. For example, it may be cruciform or rod shaped and burn like a cigarette. The cells 5 of sponge 2 are filled with liquid or semi-liquid oxidizer, e.g. gelled hydrogen peroxide, and its matrix 6 contains fuel, preferably a powdered metal or metal hydride. It is of course sometimes desirable to employ a closed cell sponge, in which case the cells 5 would not be visible. The outer surface of sponge 2 may be coated with a layer 8 of nitrocellulose, rubber, resin or other substance which prevents the loss of liquid oxidizer and also, where layer 8 is an adhesive, serves to adhere the outer surface 7 of sponge 2 to the rigid inner wall of the rocket's combustion or reaction chamber 9. The combustion gases of the propellant leave the chamber 9 via nozzle 10.

The high tensile strength hybrid bi-propellants of the present invention are capable of withstanding high pressures in the combustion chamber of the rocket without cracking or breaking up. Their strength makes them especially useful in rockets in which high pressures are produced during flight.

The following examples are given to illustrate some embodiments of the invention:

EXAMPLE 1

Isobutylene-isoprene butyl rubber having a viscosity average molecular weight of 400,000 and mole percent unsaturation of 1.5–2.0 is compounded with a linear polyethylene, having a molecular weight of 70,000 and a melting point of 130° C., in a Banbury according to the following recipe at a temperature of 270 to 290° F.

RECIPE

| Component: | Parts by weight |
|---|---|
| Butyl rubber | 70 |
| Boron powder | 40 |
| Zinc oxide | 3.5 |
| Polyethylene | 30 |
| Stearic acid | 1.0 |
| Sulfur | 1.5 |
| Para-quinone dioxime | 1.5 |
| Benzothiazyldisulfide | 2.8 |

Ten parts by weight of dinitrosopentamethylene tetramine and 4 parts by weight of Aktone, a trade name of J. M. Huber Corp. for a modified urea activator, are added to the above recipe on a hot mill which is maintained between 200 and 220° F. The compounded elastomer-resin mixture rubber is precured in a mold for 5 minutes at 280° F. and thereafter it is placed in a hot air oven at 320° F. and kept there for 10 minutes. The closed cell sponge formed has a density of 1.1 grams/cc., a tensile strength of 100 to 125 p.s.i. and an elongation of 800–1000%. An equivalent closed cell sponge containing no polyethylene has a tensile strength of 25–30 p.s.i., and an elongation of 500%. The cured sponge is immersed in tetranitromethane at room temperature for 60 minutes. After being immersed in the oxidizing agent the sponge contained 2 grams of tetranitromethane per gram of sponge. A strand of the sponge 6″ x ¼″ x ¼″ filled with tetranitromethane is ignited at the top and permitted to burn downward. It is noted that it burns evenly at a rate of 0.5–2 in./sec. at atmospheric pressure. In a strand burner at 50 p.s.i. $N_2$ pressure it burns at a rate of 10 in./sec. and produces green sparks.

EXAMPLE 2

The butyl rubber used in Example 1 is compounded with a branched polyethylene, having a molecular weight of 12,000 and a melting point of 115° C., in a Banbury at 280° F. according to the following recipe:

RECIPE

| Component: | Parts by weight |
|---|---|
| Butyl rubber | 70 |
| Polyethylene | 30 |
| Aluminum | 100 |
| Sulfur | 3.5 |
| Tetramethylthiuramdisulfide | 1.5 |
| Benzothiazyldisulfide | 1.0 |
| Zinc oxide | 10 |
| Stearic acid | 10 |

Fifteen parts by weight of soda is added to the above recipe on a cold laboratory mill (ca. 120° F.) and the compounded elastomer-resin mixture is placed in a closed mold and then blown and cured at 310° F. for 30 minutes to produce an open cell sponge having a density of 1.5 grams/cc. The open cell sponge recovered from the mold is immersed in 90% $H_2O_2$ at ambient temperature and after soaking for 15 minutes it is noted that the sponge contains 70 wt. percent of the oxidizing agent. The open cell sponge prior to filling it with the liquid oxidizing agent has a tensile strength of 50–65 p.s.i. and an elongation of 200%, while the same sponge containing no polyethylene has a tensile strength of 10–15 p.s.i. and an elongation of 200–400%. Another portion of the compounded elastomer-resin mixture is cured and blown in a strand mold (6″ x ¼″ x ¼″) for 30 minutes at 310° F. The open cell sponge strand produced in this manner is also immersed in 90% $H_2O_2$ for the same period of time and under the same conditions and thereafter ignited at the top and permitted to burn downward at atmospheric pressure. It is noted that the burning rate of the strand is approximately 0.5–2 in./sec. and that white sparks are produced when it burns.

EXAMPLE 3

Natural rubber (smoked sheets) is compounded with a linear polypropylene, having a molecular weight of 200,000 and a melting point of 165° C., according to the following recipe:

RECIPE

| Component: | Parts by weight |
|---|---|
| Natural rubber | 70 |
| Polypropylene | 30 |
| Boron | 40 |
| Sulfur | 3.5 |
| Zinc oxide | 10 |
| Stearic acid | 10 |
| Tetramethylthiuramdisulfide | 1.5 |
| Benzothiazyldisulfide | 1.0 |

To improve processability, the polypropylene is premilled at 340° F. on a laboratory rubber mill. The ingredients are then mixed on a cold mill, 15 parts of the blowing agent, soda is added last. The compounded elastomer-resin mixture is blown and cured in a 6″ x 6″ x ½″ mold at 310° F. for 30 minutes to produce an open cell sponge having a density of 1.2 g./cc. The sponge is immersed in tetranitromethane at ambient temperature and after being immersed for 15 minutes it is found to contain 75 wt. percent of the liquid oxidizer. The sponge has a tensile strength of 50–70 p.s.i. and an elongation of 200%. This tensile strength is about five times more than the tensile strength of a natural rubber sponge.

An open cell sponge strand is prepared as described in Example 1 and it is noted that it has a burning rate of 0.5–2 in./sec. and produces a green flame.

It is not intended to restrict the present invention to the foregoing examples which are given merely to demonstrate some of the embodiments of the invention. It should only be limited by the appended claims in which it is intended to claim all the novelty inherent in the invention as well as all of the modifications and equivalents coming within the scope and spirit of the invention.

What is claimed is:

1. A rocket propellant which comprises a rubbery sponge having cells and an intercellular matrix of compounded elastomer which is blown and cured, said elastomer being compounded with fuel and with at least 10 wt. percent to about 35 wt. percent of a solid resin selected from the class consisting of polyethylene, polypropylene and mixtures thereof, said weight percent of the solid resin being based on the total of elastomer and resin compounded therewith in the matrix, and said cells being filled with liquid oxidizing agent reactive with the fuel on ignition to generate combustion gas for propulsion, said oxidizing agent and said fuel composing at least 75 wt. percent of the propellant.

2. A rocket propellant according to claim 1 in which the elastomer is a hydrocarbon rubber.

3. A rocket propellant according to claim 1 in which the fuel is a metal powder.

4. A rocket propellant according to claim 1 in which the elastomer is butyl rubber.

5. A rocket propellant according to claim 1 in which the sponge is an open cell sponge.

6. A rocket propellant according to claim 1 in which the sponge is a closed cell sponge.

7. A process for making a rocket propellant which comprises mixing a solid resin selected from the class consisting of polyethylene, polypropylene and mixtures thereof with an elastomer in a proportion that makes the resin at least 10 wt. percent to about 35 wt. percent of the total elastomer and said resin, mixing of each 100 parts by weight of the elastomer and said resin, 20 to 400 parts by weight of a metal powder fuel, 0.5 to 20 parts by weight of a curing agent and 5 to 30 parts by weight of a blowing agent, heating the resulting mixture until it is cured and converted by blowing into a rubbery sponge having cells and an intercellular matrix of the elastomer compounded with the resin and the fuel, and filling the cells of the rubbery sponge with a liquid oxidizing agent which is reactive with the fuel on ignition for generating combustion gas, said oxidizing agent and the fuel composing at least about 75 wt. percent of the propellant.

8. A process according to claim 7 in which the elastomer is a hydrocarbon rubber.

9. A process according to claim 7 in which the elastomer is butyl rubber.

10. A process according to claim 7 in which the elastomer is natural rubber.

References Cited
UNITED STATES PATENTS

| | | | |
|---|---|---|---|
| 3,143,446 | 8/1964 | Berman | 149—2 |
| 3,163,113 | 12/1964 | Davis et al. | 102—98 |

BENJAMIN R. PADGETT, Primary Examiner

U.S. Cl. X.R.

102—102; 149—2, 20, 87, 109